US006563630B1

(12) United States Patent  (10) Patent No.: US 6,563,630 B1
Jacob et al.  (45) Date of Patent: May 13, 2003

(54) OPTICAL AMPLIFIER APPARATUS

(75) Inventors: David Jacob, Avon (FR); Michel Prassas, Avon (FR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/529,191

(22) PCT Filed: Aug. 12, 1998

(86) PCT No.: PCT/US98/16558
§ 371 (c)(1),
(2), (4) Date: Apr. 10, 2000

(87) PCT Pub. No.: WO99/17410
PCT Pub. Date: Apr. 8, 1999

(30) Foreign Application Priority Data
Sep. 29, 1997 (FR) .............................. 97 12083

(51) Int. Cl.$^7$ ................................. H01S 3/00
(52) U.S. Cl. ................ 359/341.2; 359/134; 359/337.1
(58) Field of Search .................. 359/134, 160, 359/161, 337.1, 341.2

(56) References Cited

U.S. PATENT DOCUMENTS

| 3,805,242 A | * | 4/1974 | Matsumoto et al. | ........ 340/163 |
| 4,118,772 A | * | 10/1978 | Takada | ........ 364/119 |
| 5,161,044 A | | 11/1992 | Nazarathy et al. | |
| 5,237,570 A | * | 8/1993 | Smolinske et al. | ........ 370/95.1 |
| 5,365,368 A | * | 11/1994 | Hsu et al. | ........ 3592/341 |
| 5,459,328 A | | 10/1995 | Kadota et al. | |
| 5,563,733 A | * | 10/1996 | Mitsuda et al. | ........ 359/341 |
| 5,633,741 A | * | 5/1997 | Giles | ........ 359/124 |
| 6,014,407 A | * | 1/2000 | Hunsinger et al. | ........ 375/206 |

FOREIGN PATENT DOCUMENTS

| DE | 19816896 | * 10/1998 |
| JP | 8-54580 | 8/1994 |

OTHER PUBLICATIONS

Jacob et al, OFC '98, Tech. Digest, vol. 2, pp. 36–38, Feb. 22, 1998. abstract only herewith.*

* cited by examiner

Primary Examiner—Nelson Moskowitz
(74) Attorney, Agent, or Firm—Svetlana Short

(57) ABSTRACT

There is proposed an optical amplifier apparatus particularly for use in networks distributing signals by optical fibers, comprising first and second parallel optical branches (1, 2), the first optical branch (1) including optical amplifier means (5, 6) for amplifying digital signals and the second optical branch including optical amplifier means (7) for amplifying analogue signals, the optical amplifier means (5, 6) of the first optical path (1) being adapted to amplify bidirectional digital signals and the optical amplifier means (7) of the second optical branch (2) being adapted to amplify unidirectional analogue signals.

13 Claims, 2 Drawing Sheets

OPTICAL AMPLIFIER APPARATUS

Figure 1:
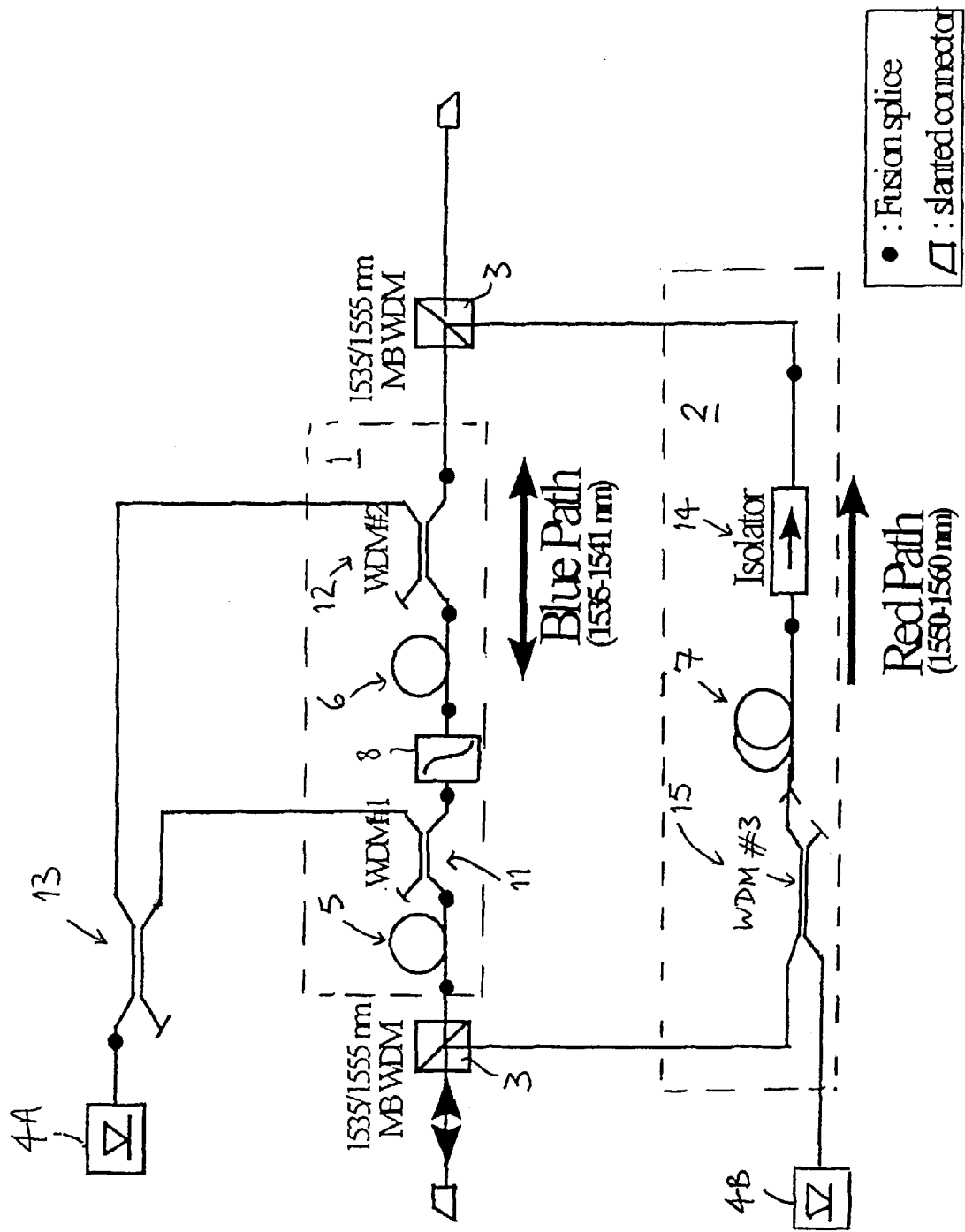

The present invention relates to a new type of optical amplifier apparatus especially, but not exclusively, optical amplifier apparatus intended for use in an optical fiber networks.

Optical fiber is penetrating rapidly in subscriber access networks for distribution of CATV (cable television) services. Today's CATV headend stations feed distributive services to large numbers of subscribers (>1000) in networks with abundant splitting in the fiber part as well as in the coaxial part. The present demand for interactive services, like teleworking and high quality videotelephony, is increasing but it requires a high-bandwidth and bi-directional link between servers and customers. To implement such interactive services in CATV networks, it is necessary to develop high definition wave division multiplexing (HDWDM) techniques and devices. One of these essential devices is a bi-directional multiwavelength optical amplifier which has to compensate for the propagation and the splitting losses along the link for both upstream and downstream signals. No such device is currently available.

The present invention provides a new optical amplifier architecture having two parallel optical branches, one for amplifying digital signals and the other for amplifying analogue signals. These optical branches are parallel in the sense that they are connected in parallel such that certain signals pass through one of the branches while others pass, possibly simultaneously, through the other. Preferred embodiments of this optical amplifier apparatus enable simultaneous amplification of an analogue CATV signal and a plurality of multiplexed bi-directional digital signals, compensating the propagation and splitting losses along the link for both upstream and downstream signals.

It is particularly preferred that the optical amplifier apparatus of the present invention should make use of erbium doped fibber amplifier (EDFA) elements. Typically, the wavelengths handled by the digital path in the optical amplifier apparatus will be in the shorter wavelength region (e.g. 1530–1545 nm) of the EDFA gain spectrum whereas the wavelengths handled by the analogue path of the optical amplifier will be in the longer wavelength region (1550–1560 nm). The frequency modulation of the analogue signal often results in a frequency variation of the transmitting laser. The use of the 1550–1560 nm band for the amplification of the analogue signal enables distortion of the analogue signal, due to this frequency variation of the transmitter laser, to be reduced thanks to the fact that the gain slope of the EDFA element is gentler in this part of the spectrum.

In one embodiment of the invention, the optical branch handling the digital signals has first and second amplifying portions (advantageously, embodied as respective EDFA coils) and a gain flattening filter arranged between these two amplifying portions. With this arrangement, the position of the gain flattening filter can be selected such that the best compromise can be reached between low noise and optimal output power for both upstream and downstream channels.

It is also preferred that two lasers should be used to drive the amplifying means in the parallel analogue and digital paths. In this way, the gain of each path can be controlled independently of the other. It is particularly preferred that each of the lasers should drive a respective amplifying means in the digital path whereas only one of the lasers drives the amplifying means in the analogue path.

Preferably the parallel digital and analogue paths are joined together at their ends by wavelength division multiplexer/demultiplexer devices. Not only do such devices enable the digital and analogue signals to be separated and recombined as desired, but also they reduce multiple path interference induced cross-talk and improve the noise figures of both analogue and digital sections by filtering the amplified spontaneous emission (ASE). It is also desirable that an optical isolator be included in the analogue branch, when the latter handles unidirectional signals.

In order to promote compactness of the overall apparatus, it can be useful to integrate with the optical amplifier apparatus of the present invention, the first signal splitter of the distributive network.

Figure 2:
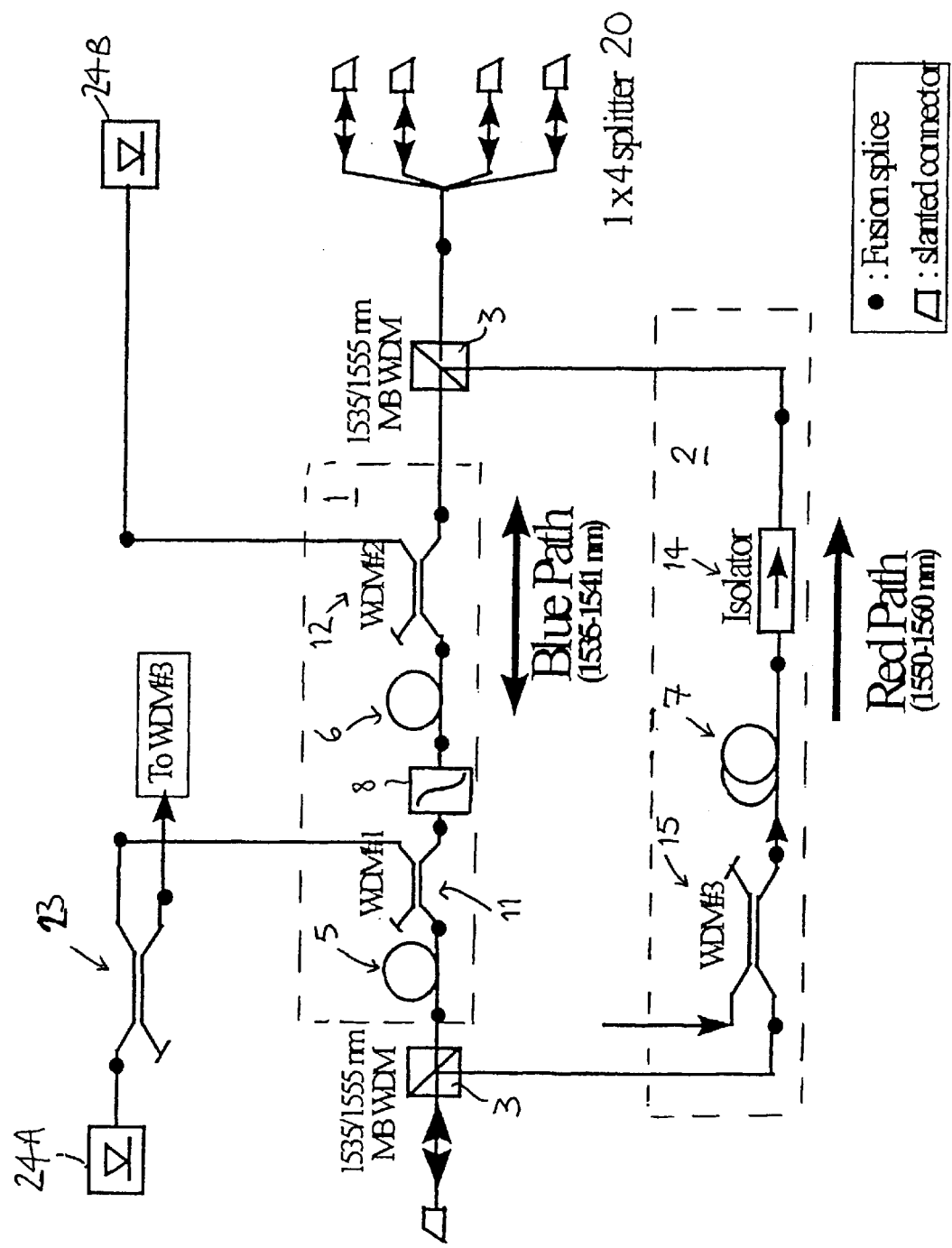

Further features and advantages of the present invention will become apparent from the following description of preferred embodiments thereof, given by way of example, and illustrated in the accompanying drawings, in which:

FIG. 1 shows the general construction of a first embodiment of optical amplifier apparatus according to the present invention; and FIG. 2 shows the general construction of a second embodiment of optical amplifier apparatus according to the present invention.

As illustrated in FIG. 1, the optical amplifier apparatus of the present invention includes first and second parallel optical branches 1 and 2. The first parallel branch, 1, is adapted to amplify a plurality of multiplexed bi-directional digital signals, whereas the second optical path is adapted to amplify a unidirectional analogue signal, particularly, such a signal of relatively broad band.

The parallel optical branches are joined together at their ends by wavelength division multiplexing/demultiplexing (WDM) devices 3 and are driven by first and second laser diodes 4A and 4B. In the present example, the laser diodes 4A and 4B operate at 980 nm and have an output power of 120 mW. The WDM devices 3 are band splitters of medium bandwidth and serve to separate and recombine the analogue channel and the digital channels. They also reduce cross-talk induced by multiple path interference (MPI) and to improve the noise figures of both sections by filtering the amplified spontaneous emission.

In this embodiment of the invention, the parallel branches of the amplifier apparatus make use of erbium-doped fiber amplifiers 5, 6 and 7. The first parallel branch 1 operates in the shorter wavelength band (1530–1545 nm) of the gain spectrum of erbium whereas the second parallel branch 2 operates in the longer wavelength band (1550–1560 nm) of the erbium gain spectrum. The use of the longer wavelength band enables a reduction in the analogue signal distortion caused by the frequency variation of the transmitter laser (when the latter is internally modulated), as explained above.

The first optical branch 1 is bi-directional (that is, there is no optical isolator). This optical branch 1 is used to amplify at the same time upstream and downstream digital channels and, with a channel spacing of 0.8 nm (100 GHz) between two adjacent multiplexed upstream and downstream channels, up to 8 digital channels (e.g. 4 upstream, 4 downstream) can be accommodated in the 1535–1541 nm window. The wavelength interleaving of the upstream and downstream signals makes it possible to reduce possible four-wave mixing effects between co-propagating signals, while only using a small spectral range of the gain curve.

Preferably, amplification is achieved in the first optical branch using two amplifying sections (here EDFA coils 5 and 6) with a gain flattening filter 8 disposed between them. The gain flattening filter serves to reduce the gain ripple between the different digital channels. By using two amplifying sections 5 and 6, an optimum position for the gain flattening filter 8 can be found, which enables the achievement of a suitable compromise between noise performance and optimum output power for both upstream and downstream channels. In the present example the two amplifying sections 5 and 6 are formed of a first EDFA coil 5.5 m long and a second EDFA coil 12 m long, respectively.

In the present embodiment, the pump laser diode 4A drives the first and second amplifying sections 5 and 6 of the first optical path via a coupler 13 and respective wave division multiplexing (WDM) devices 11 and 12.

The second optical branch 2 is unidirectional and, when this optical amplifier apparatus is used in a network distributing CATV and digital services, serves to amplify the analogue CATV signal. This branch includes a single amplifying section, embodied in this example as an EDFA coil of 15.5 m in length. An optical isolator 14 is included in this second optical branch 2 so as to reduce back reflection effects. The pump laser 4B drives the amplification in second optical branch 2 via a WDM coupling device 15.

The pump configuration described above is advantageous since the gain or output power of each of the parallel branches can be controlled independently of that or those of the other branch. Thus, in a CATV application, the output power of the CATV signal could be changed, by changing the excitation current of the pump laser 4B, without altering the output power of the digital channels. Similarly, if it is desired to change the output power of the digital branch alone, the excitation current of pump laser 4A alone could be changed.

If it is desired to change the output power of optical branch 2 then the power of laser diode 24A is altered and a compensating change is made to the output power of laser diode 24B. On the other hand, if it is desired to change the output power of optical branch 1, then the output power of laser diode 24B alone is adjusted.

The performance of the optical amplifier apparatus illustrated in FIG. 2 will now be illustrated by reference to the results of certain experiments which have been performed. All of the described experiments were performed at ambient temperature and at constant pump power of 130 mW for the first pump laser 24A and a pump power of 80 mW for the second pump laser 24B.

Measurements for the Analogue Branch

The noise figure and output power of the analogue amplifying branch 2 were investigated by scanning the wavelength of the input signal from 1550 nm to 1560 nm (with a step of 1 nm). For each wavelength, the input power was successively set to −5 dBm, 0 dBm and +5 dBm, representative of possible operating points of the amplifier. Under these conditions, the noise figure and output power were as indicated in Table 1 below.

TABLE 1

| | $P_{out}$ (dBm) (*) $\lambda_{CATV}$ σ [1550–1560] | NF (dB) (*) $\lambda_{CATV}$ σ [1550–1560] | Gain (dB) (*) $\lambda_{CATV}$ σ [1550–1560] |
|---|---|---|---|
| Pin = −5 dBm | 6.5 dBm < $P_{out}$ < 6.6 dBm | 4.3 dB < NF < 4.6 dB | 11.5 dB < G < 11.6 dB |
| Pin = 0 dBm | 6.8 dBm < $P_{out}$ < 6.9 dBm | 4.8 dB < NF < 5.2 dB | 6.8 dB < G < 6.9 dB |
| Pin = +5 dBm | 7.1 dBm < $P_{out}$ < 7.2 dBm | 5.7 dB < NF < 6.0 dB | 2.1 dB < G < 2.2 dB |

(*) for the highest loss output port

A second embodiment of optical amplifier apparatus according to the present invention is illustrated in FIG. 2. The second embodiment has many elements similar to those of the first embodiment and, accordingly, the same reference numerals have been used therefor.

There are two main aspects of the apparatus of the second embodiment which differ from the first embodiment. Firstly, as illustrated in FIG. 2, the optical amplifier apparatus of the second embodiment integrates the first splitter 20 of the distributive network. In this example, the integrated splitter 20 is a four-way splitter. Secondly, the drive arrangement of the second embodiment is different from that of the first embodiment.

Considering the drive arrangement of FIG. 2 in greater detail, it will be seen that although two laser diodes 24A, 24B are still used to drive the parallel optical paths, the arrangement of these laser diodes has been changed. In particular, in the present embodiment, the two co-propagating pump lasers 24A and 24B are coupled to the two amplifying sections of the first parallel path 1 via respective WDM coupling devices 11 and 12. The pump laser 24A is coupled to the first WDM coupling device 11 via a 3 dB tap coupler 23 which splits the laser power provided by the drive laser 24A such that a portion thereof is fed to the second parallel optical branch 2 via a further WDM coupling device 15.

With the pump arrangement of FIG. 2 also, the gain or output power of each of the parallel optical branches can be controlled independently of that or those of the other branch.

The gain slope of the analogue amplifying branch was investigated using two signals, one signal was used to saturate the gain at the wavelength of the CATV signal whereas the second was used as a weak probe signal to monitor the gain around the CATV wavelength. The saturating beam was successively set to 1550, 1555 and 1560 nm with saturating input power set to −5 dBm, 0 dBm and +5 dBm for each wavelength. For each of these saturation conditions, the probe beam wavelength was scanned around the CATV wavelength with an input power of −35 dBm and the local gain slope was evaluated in 1 nm widths. The results are indicated in Table 2 below.

TABLE 2

| | Gain slope $\Delta G/\Delta\lambda$ (dB/nm) for $\lambda_{CATV}$ σ [1550–1560] |
|---|---|
| Pin = −5 dBm | 0.1 < $\Delta G/\Delta\lambda$ < 0.25 |
| Pin = 0 dBm | 0.1 < $\Delta G/\Delta\lambda$ < 0.25 |
| Pin = +5 dBm | 0.1 < $\Delta G/\Delta\lambda$ < 0.25 |

It is interesting to note from table 2 that the gain slope in each case is below 0.25 dB/nm, which is typical of type II erbium-doped fibers. This architecture is thus suited to use in CATV applications, the maximum tolerable value of gain slope being 0.25 dB/nm in such applications.

Measurements for the Digital Branch

With respect to the downstream direction, the noise figure, gain and gain flatness were investigated in three steps and using three lasers. For all the measurements, an upstream saturating signal at 1538 nm (mean wavelength of the digital channels) with an optical input power of −13 dBm (maximum total upstream power carried by the 4 upstream channels at the entrance of the 1×4 splitter) was injected in the amplifier through one of the 1×4 output connectors. First, the downstream gain and noise figure were measured with a downstream signal at 1538 nm for various saturation input power values: −7, −10, −20, −30 dBm (see Table 3). Secondly, a −13 dBm downstream probe signal at 1535 nm was added at the input port of the amplifier and the 1538 nm signal was adjusted to −8.2 dBm so that the total downstream input power remained constant at −7 dBm. Finally, the signal at 1535 nm was replaced by a −13 dBm signal at 1541 nm. For these operating conditions, it can be postulated that the average inversion along the amplifier will lead to a monotonic decrease of the gain from 1535 to almost 1541 nm, even in presence of the gain flattening filter. Then the gain ripple is simply given by the gain difference between these two wavelengths (see Table 4).

TABLE 3

|  | Net Gain (dB) | NF (dB) |
| --- | --- | --- |
| Pin = −7 dBm | 16.3 | 5.6 |
| Pin = −10 dBm | 18.9 | 5.8 |
| Pin = −20 dBm | 24.7 | 5.4 |
| Pin = −30 dBm | 28.4 | 5.3 |

TABLE 4

| $G_{max}$ (@1535 nm) | $G_{min}$ (@1541 nm) | $\Delta G = G_{max} - G_{min}$ | NF $\lambda\sigma$ [1535–1541] |
| --- | --- | --- | --- |
| 17.3 dB | 16.2 dB | 1.1 dB | 5.9 dB < NF < 6.0 dB |

With respect to the upstream direction, measurements were made in the same way as for the downstream direction. Thus, for all the measurements, a downstream saturating signal at 1538 nm with an optical input power of −7 dBm was injected in the amplifier through the input connector. First, the upstream gain and noise figure were measured with an upstream signal at 1538 nm for various saturation input power values: −13, −20, −30 dBm (see Table 5). Secondly, a −19 dBm downstream probe signal at 1535 nm was added at one output port of the amplifier and the 1538 nm signal was adjusted to −14.25 dBm so that the total upstream input power remained constant at −13 dBm. Finally, the signal at 1535 nm was replaced by a −19 dBm signal at 1541 nm. The gain ripple is given as previously (see Table 6).

TABLE 5

|  | Net Gain (dB) | NF (dB) (*) |
| --- | --- | --- |
| Pin = −13 dBm | 16.1 | 7 |
| Pin = −20 dBm | 16.5 | 6.7 |
| Pin = −30 dBm | 20.5 | 2.9 |

TABLE 6

| $G_{max}$ (@1535 nm) | $G_{min}$ (@1541 nm) | $\Delta G = G_{max} - G_{min}$ | NF $\lambda\sigma$ [1535–1541] |
| --- | --- | --- | --- |
| 18.5 dB | 16.1 dB | 2.4 dB | 6.5 dB < NF < 9.4 dB |

(*)In Tables 5 and 6, the values of the noise figures NF do not take into account the losses (of the order of 7 dB) associated with the 1 × 4 splitter at the output of the amplifier.

It will be seen from the above-described experimental results that the optical amplifier apparatus of the present invention has performance characteristics which are highly suitable for an application in a network distributing CATV and multiplexed digital signals.

Although the present invention has been described with reference to two specific embodiments thereof, the invention is not limited to the detailed implementations of these two embodiments. On the contrary, numerous modifications and adaptations of the apparatus can be made.

For example, the quoted operating wavelengths, powers and excitation currents of the laser diodes are merely illustrative, other values are possible. Similarly, the quoted lengths of the various EDFA elements are merely illustrative, the appropriate lengths will require adjustment depending upon the application and the desired performance.

Similarly, drive arrangements other than those illustrated in FIGS. 1 and 2 are possible. For example, in the embodiment of FIG. 1, instead of using a single drive laser 4A and a 3 dB, 1×2 coupler 13 to drive the two amplifying sections 5 and 6 of the digital branch, a pair of laser diodes and a 2×2 coupler could be used. In this way, by providing redundancy the digital amplifier branch is protected against possible breakdown (in the event of breakdown of one of the drive lasers, amplification will still take place, with losses of only 3 dB)

What is claimed is:

1. Optical amplifier apparatus particularly for use in networks distributing signals via optical fibers, the apparatus comprising:

first and second parallel optical branches (1, 2), the first optical branch (1) including optical amplifying sections (5, 6) amplifying only substantially digital signals and the second optical branch including optical amplifying sections (7) amplifying only substantially analogue signals, wherein the amplifying sections or portions are constituted by erbium-doped fiber amplifiers (EDFA), the first optical branch (1) uses a shorter wavelength (blue) region of the EDFA gain spectrum and the second optical branch (2) uses a longer wavelength (red) region of the EDFA gain spectrum.

2. Optical amplifier apparatus according to claim 1, wherein the optical amplifying sections (5, 6) of the first optical branch (1) is adapted to amplify bi-directional digital signals and the amplifying sections (7) of the second optical branch (2) is adapted to amplify unidirectional analogue signals.

3. Optical amplifier apparatus according to claim 1 or 2, wherein the optical amplifying sections (5, 6) of the first optical branch (1) is adapted to amplify wavelength division multiplexed digital signals.

4. Optical amplifier apparatus according to claim 1, 2, or 3 wherein the optical amplifying sections (5, 6) of the first optical branch (1) comprises first (5, 11) and second (6, 12) amplifying portions and a gain flattening filter (8) arranged between said first and second amplifying portions.

5. Optical amplifier apparatus according to claim 4 wherein it comprises first and second pump lasers (4A, 4B) coupled to the first and second optical branches (1, 2) such that the gain or output power of each of the parallel optical branches can be controlled independently of that or those of the other optical branch.

6. Optical amplifier apparatus according to claim 5, wherein the first pump laser (24A) is coupled to the second optical branch (2) and to the first amplifying section (5) of the first optical branch (1) whereas the second pump (24B) laser is coupled to the second amplifying section (6) of the first optical branch (1).

7. Optical amplifier apparatus according to claim 1, wherein said shorter wavelength region of the EDFA spectrum concerns the wavelength range 1530–1545 4nm, and the longer wavelength region of the EDFA gain spectrum concerns the wavelength range 1550–1560 nm.

8. Optical amplifier apparatus according to any previous claim wherein the ends of the first and second parallel optical branches (1, 2) are joined together via wavelength division multiplexer (WDM) devices (3).

9. Optical amplifier apparatus according to any previous claim, wherein the second optical branch (2) includes an optical isolator (14).

10. Optical amplifier apparatus according to any previous claim, wherein it further comprises a splitter (20) connected to an output of the apparatus.

11. Optical amplifier apparatus according to any previous claim, wherein the second optical branch (2) is adapted to amplify a CATV signal.

12. Optical amplifier apparatus according to claim 1, wherein the amplifier means (5,6) are both counter-pumped, with respect to at least one digital signal, by an output power portion of the first pump laser (4A).

13. Optical amplifier apparatus according to claim 1, wherein the analogue signal amplifying-section (7) is forward-pumped by an output power portion of the first pump laser (4A) and digital signal amplifying section (5) is counter-pumped, with respect to at least one digital signal, the first pump laser (24A).

* * * * *